United States Patent
Lunsford et al.

(10) Patent No.: US 7,296,107 B2
(45) Date of Patent: *Nov. 13, 2007

(54) SYSTEM AND METHOD FOR DETECTION OF AN ACCESSORY DEVICE CONNECTION STATUS

(75) Inventors: Eric M. Lunsford, San Carlos, CA (US); Steven C. Lemke, Sunnyvale, CA (US); Neal A. Osborn, Milpitas, CA (US); Francis J. Canova, Jr., Fremont, CA (US); Scott R. Johnson, Sunnyvale, CA (US)

(73) Assignee: Palm, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/696,153

(22) Filed: Oct. 28, 2003

(65) Prior Publication Data

US 2004/0073823 A1 Apr. 15, 2004

Related U.S. Application Data (63) Continuation of application No. 10/287,990, filed on Nov. 4, 2002, now Pat. No. 6,665,803, which is a continuation of application No. 09/298,113, filed on Apr. 23, 1999, now Pat. No. 6,523,124.

(51) Int. Cl.
*G06F 13/00* (2006.01)
(52) U.S. Cl. .................................................. 710/304
(58) Field of Classification Search ........ 713/300–340; 710/304
See application file for complete search history.

(56) References Cited

U.S. PATENT DOCUMENTS

| | | | | |
|---|---|---|---|---|
| 3,744,034 A | * | 7/1973 | Paul ........................... | 711/164 |
| 4,860,372 A | * | 8/1989 | Kuzunuki et al. .......... | 382/189 |
| 4,972,496 A | * | 11/1990 | Sklarew ..................... | 382/187 |
| 5,231,381 A | * | 7/1993 | Duwaer ...................... | 345/174 |
| 5,305,394 A | * | 4/1994 | Tanaka ....................... | 382/189 |
| 5,332,993 A | * | 7/1994 | Ninomiya ................... | 340/635 |
| 5,349,668 A | | 9/1994 | Gladstein et al. | |
| 5,386,567 A | * | 1/1995 | Lien et al. .................. | 713/100 |
| 5,389,745 A | * | 2/1995 | Sakamoto ................ | 178/18.03 |

(Continued)

FOREIGN PATENT DOCUMENTS

EP 0560510 A1 9/1993

OTHER PUBLICATIONS

Ed Nisley, "Two-Way Power Line Communication", Mar. 1992, The computer Applications Journal pp. 74-76 78-81.*

(Continued)

*Primary Examiner*—Paul R. Myers
(74) *Attorney, Agent, or Firm*—Shemwell Mahamedi LLP (57) ABSTRACT

Embodiments of this invention provide for a portable computer that determines whether an accessory device is actively connected to it. In one embodiment, the portable computer may include a signal line accessible through an output of the portable computing device. The signal line may be connected to a communication device such as a communication cradle. The portable computer may detect a signal on the signal line to determine whether the communication device is actively connected to the portable computer. If the communication device is actively connected, the portable computer suspends implementation of a time-out feature that would otherwise reduce power consumption of the portable computer.

30 Claims, 7 Drawing Sheets

U.S. PATENT DOCUMENTS

| | | | | |
|---|---|---|---|---|
| 5,434,929 | A | * | 7/1995 | Beernink et al. ............ 382/187 |
| 5,442,794 | A | | 8/1995 | Wisor et al. |
| 5,444,192 | A | * | 8/1995 | Shetye et al. ............ 178/18.09 |
| 5,452,371 | A | * | 9/1995 | Bozinovic et al. .......... 382/187 |
| 5,463,261 | A | * | 10/1995 | Skarda et al. ............... 307/131 |
| 5,463,742 | A | * | 10/1995 | Kobayashi .................. 710/303 |
| 5,504,908 | A | * | 4/1996 | Ikeda ......................... 713/300 |
| 5,526,493 | A | * | 6/1996 | Shu ............................. 710/304 |
| 5,528,743 | A | * | 6/1996 | Tou et al. .................... 715/541 |
| 5,534,892 | A | * | 7/1996 | Tagawa ....................... 345/173 |
| 5,557,738 | A | * | 9/1996 | Townsley et al. ............. 714/14 |
| 5,581,772 | A | | 12/1996 | Nanno et al. |
| 5,613,135 | A | * | 3/1997 | Sakai et al. .................... 710/62 |
| 5,615,284 | A | * | 3/1997 | Rhyne et al. ................ 382/187 |
| 5,621,817 | A | * | 4/1997 | Bozinovic et al. .......... 382/189 |
| 5,630,148 | A | * | 5/1997 | Norris ......................... 713/322 |
| 5,648,762 | A | * | 7/1997 | Ichimura et al. .............. 726/34 |
| 5,652,891 | A | * | 7/1997 | Kitamura et al. ........... 713/324 |
| 5,666,256 | A | | 9/1997 | Zavis et al. |
| 5,698,822 | A | * | 12/1997 | Haneda et al. ........... 178/18.01 |
| 5,710,911 | A | * | 1/1998 | Walsh et al. ................ 713/500 |
| 5,710,931 | A | | 1/1998 | Nakamura et al. |
| 5,717,936 | A | | 2/1998 | Uskali |
| 5,754,436 | A | * | 5/1998 | Walsh et al. ................ 713/300 |
| 5,758,099 | A | * | 5/1998 | Grieco et al. ................ 710/301 |
| 5,768,541 | A | * | 6/1998 | Pan-Ratzlaff ............... 710/304 |
| 5,781,744 | A | | 7/1998 | Johnson et al. |
| 5,784,295 | A | | 7/1998 | Hinohara |
| 5,832,286 | A | * | 11/1998 | Yoshida ...................... 713/324 |
| 5,841,901 | A | * | 11/1998 | Arai et al. ................... 382/187 |
| 5,859,970 | A | * | 1/1999 | Pleso .......................... 709/250 |
| 5,875,307 | A | * | 2/1999 | Ma et al. .................... 710/304 |
| 5,946,392 | A | | 8/1999 | Tague |
| 5,987,545 | A | * | 11/1999 | Oh .............................. 710/100 |
| 6,038,457 | A | * | 3/2000 | Barkat ...................... 455/556.1 |
| 6,088,620 | A | * | 7/2000 | Ninomiya et al. ............. 700/16 |
| 6,154,798 | A | * | 11/2000 | Lin et al. ...................... 710/72 |
| 6,195,718 | B1 | * | 2/2001 | Hennessy et al. ........... 710/304 |
| 6,453,378 | B1 | * | 9/2002 | Olson et al. ................. 710/304 |
| 6,457,134 | B1 | | 9/2002 | Lemke et al. |
| 6,460,106 | B1 | * | 10/2002 | Stufflebeam ................ 710/304 |
| 6,629,182 | B1 | * | 9/2003 | Mizoguchi et al. ......... 710/303 |
| 2002/0091953 | A1 | * | 7/2002 | Min ............................. 713/320 |

OTHER PUBLICATIONS

Gray, R. et al., "Efficient MC68HC08 programming: reducing cycle count and improving code density", *Dr. Dobb's Journal*, vol. 20, No. 5, May 1995, pp. 70-75.

Ruley, J. et al., "Handheld-to-Handheld Combat", *Windows Magazine*, No. 811, p. 55, Nov. 1997.

Dayton, D., "FRx extends reporting power of Platinum Series", *PC Week*, vol. 8, No. 5, p. 29(2), Feb. 1991.

Forbes, J. et al., "Palm PCs get a Big Hand (What's Hot)", *Windows Magazine*, No. 905, p. 96, May 1998.

Penwarden, M., "More Muscle for HP's OmniBook", *Windows Magazine*, No. 501, p. 110, Jan. 1994.

Fiegel, C., "IBM, Motorola preview embedded PowerPCs; 403 and 505 processors combine strong performance with low cost", *Microprocessor Report*, vol. 8, No. 6, pp. 1-5, May 1994.

Bursky, D., "Evolving DSP chips do more", *Electronic Design*, vol. 38, No. 23, pp. 51-59, Dec. 1990.

"Method for Warning Users of a Low Battery Condition on a Battery-Powered Computer", *IBM Technical Disclosure Bulletin*, vol. 29, No. 6, Nov. 1986, pp. 2461-2463.

Katsumi, O., "Battery Exchange Informing Device for Electronic Equipment", *Patent Abstracts of Japan* (JP 04279918), vol. 17, No. 76, Feb. 1993.

Minoru, M., "Electronic Appliance", *Patent Abstracts of Japan*, (JP 61246821), vol. 11, No. 93, Mar. 24, 1987.

Yuichi, I., "Power Control Circuit for Battery Operation Device", *Patent Abstracts of Japan* (JP 06059785), vol. 18, No. 298, Jun. 7, 1994.

Yukichi, N., "Electronic Equipment", *Patent Abstracts of Japan* (JP 04307613), vol. 17, No. 127, Mar. 17, 1993.

Yoshihiro, Y., "Copying Machine", *Patent Abstracts of Japan* (JP 05297659), vol. 18, No. 96, Feb. 16, 1994.

Katsuyoshi, K., "Battery Life Monitoring Device", *Patent Abstracts of Japan* (JP 08220199), vol. 1996, No. 12, Dec. 26, 1996.

\* cited by examiner

SYSTEM AND METHOD FOR DETECTION OF AN ACCESSORY DEVICE CONNECTION STATUS

This application is a continuation application of Ser. No. 10/287,990, filed Nov. 4, 2002, entitled SYSTEM AND METHOD FOR DETECTION OF AN ACCESSORY DEVICE CONNECTION STATUS, now U.S. Pat. No. 6,665,803; which is a continuation application of Ser. No. 09/298,113, filed Apr. 23, 1999, entitled SYSTEM AND METHOD FOR DETECTION OF AN ACCESSORY DEVICE CONNECTION STATUS, now U.S. Pat. No. 6,523,124. Both of the aforementioned priority applications are hereby incorporated by reference herein in their respective entirety.

BACKGROUND OF THE INVENTION

1. Field of the Invention

This invention pertains to a portable computing device. More specifically, embodiments of this invention provide for detecting and/or determining a type of an accessory device connected to a portable computing device.

2. Description of the Related Art

Portable computers such as laptop and handheld computers may be provided with additional capabilities through the use of accessory devices. The accessory devices may electrically couple to a processor of the portable computer to provide communication capabilities and external power. Accessory devices in general have been used to add functions and resources to portable computers to compensate for inherent limitations arising from their size and mobility. Previous accessory devices have been used to provide, among other things, an alternating current (A/C) supply, serial and parallel ports, modems, additional memory, and universal serial ports. The portable computer may use accessory devices to communicate with larger computers and data networks.

Portable computers are typically equipped with a time-out feature that turns the computer off after a predetermined duration of inactivity. The time-out feature is designed to preserve battery life. While the time-out feature may be necessary when the portable computer is operating from an internal battery source, accessory devices may supply an A/C converter to the portable computer to eliminate the need for the time-out feature. However, previous portable computers provide for the time-out feature to be enabled so that the portable computer switches off after a period of inactivity, even if the accessory device is supplying external power. Still, other portable computers, such as Zaurus™ personal digital assistant manufactured by the Sharp Corp. and PalmPilot™ organizers manufactured by the 3Com Corp., disable the time-out feature only when an A/C power adapter is supplied to a power terminal of the portable computer.

These devices do not disable the time-out feature when an accessory device such as a communication cradle is connected to the portable computer through a communications port. In such instances, the time-out feature can be limiting and a nuisance to the user by precluding, for example, use of programs that require minimal user interaction. Therefore, there is a need for enabling the portable computer to detect whether an accessory device supplying external power is actively connected to the portable computer.

Furthermore, a number of different types of accessories are available for use with portable computers. However, previous portable computers are not equipped to automatically determine the type of accessory device that is actively connected to the portable computer. Without this ability, the user is required to perform additional software functions to identify the particular accessory device for the portable computer. In addition, the portable computer may accidentally execute an application for an accessory device other than the one being used. In certain applications, this can be harmful to the portable computer and/or the accessory device. For example, the PalmPilot III™ may access a modem accessory device by executing a software application configured only for modem devices. In some instances, the software application may be damaging if the accessory device connected to the portable computer is erroneously identified as a modem device. Therefore, there is a need for enabling the portable computer to automatically determine the type of the accessory actively connected to it.

These and other shortcomings of previous portable computers will be addressed by various embodiments of this invention.

SUMMARY OF THE INVENTION

Embodiments of this invention provide for a portable computer that determines whether an accessory device is actively connected to it. In one embodiment, the portable computer may include a signal line accessible through an output of the portable computing device. The signal line may be connected to a communication device such as a communication cradle. The portable computer may detect a signal on the signal line to determine whether the communication device is actively connected to the portable computer. If the communication device is actively connected, the portable computer suspends implementation of a time-out feature that would otherwise reduce power consumption of the portable computer.

Embodiments of this invention eliminate time constraints present in previous devices that require the user to periodically interact with the portable computer in order to sustain its operation. As a result, the portable computer may operate programs continuously by connecting to an accessory device such as a communications cradle through a communications or output port. In this way, when the portable computer is connected to the communication device, the portable computer may continuously display, for example, a clock, photographs, or calendars.

DETAILED DESCRIPTION

An embodiment of this invention provides for detecting a type of accessory device connected to a portable computer. The portable computer then implements software to accommodate the specific accessory device detected. Another embodiment of this invention provides for detecting whether a communication accessory, such as a communication cradle, is actively connected to the portable computer. The portable computer then suspends a time-out feature, as the communication device supplies external power to the portable computer.

Figure 2:
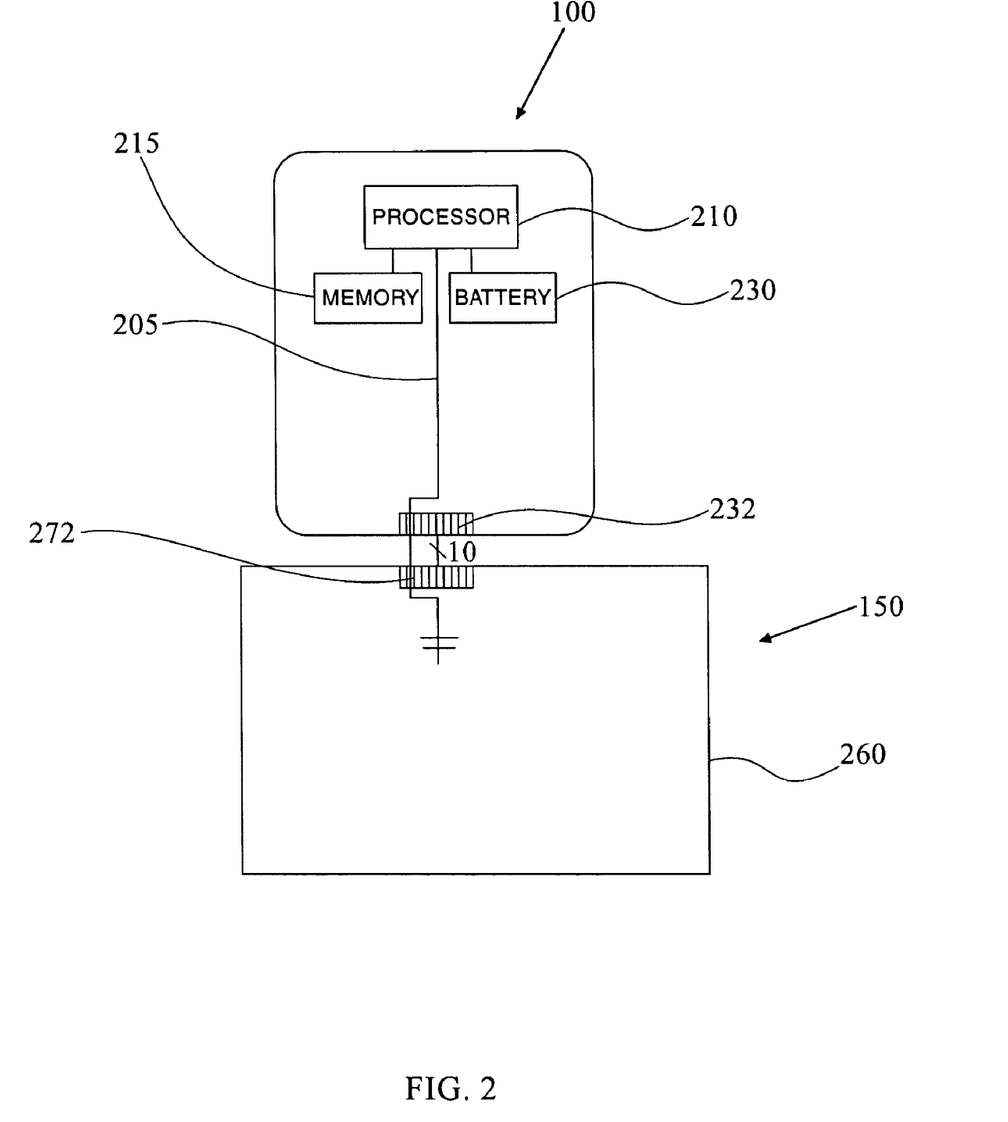
FIG. 2 is a schematic of an embodiment of this invention for detecting an accessory device actively connected to a portable computing device.
Figure 3:
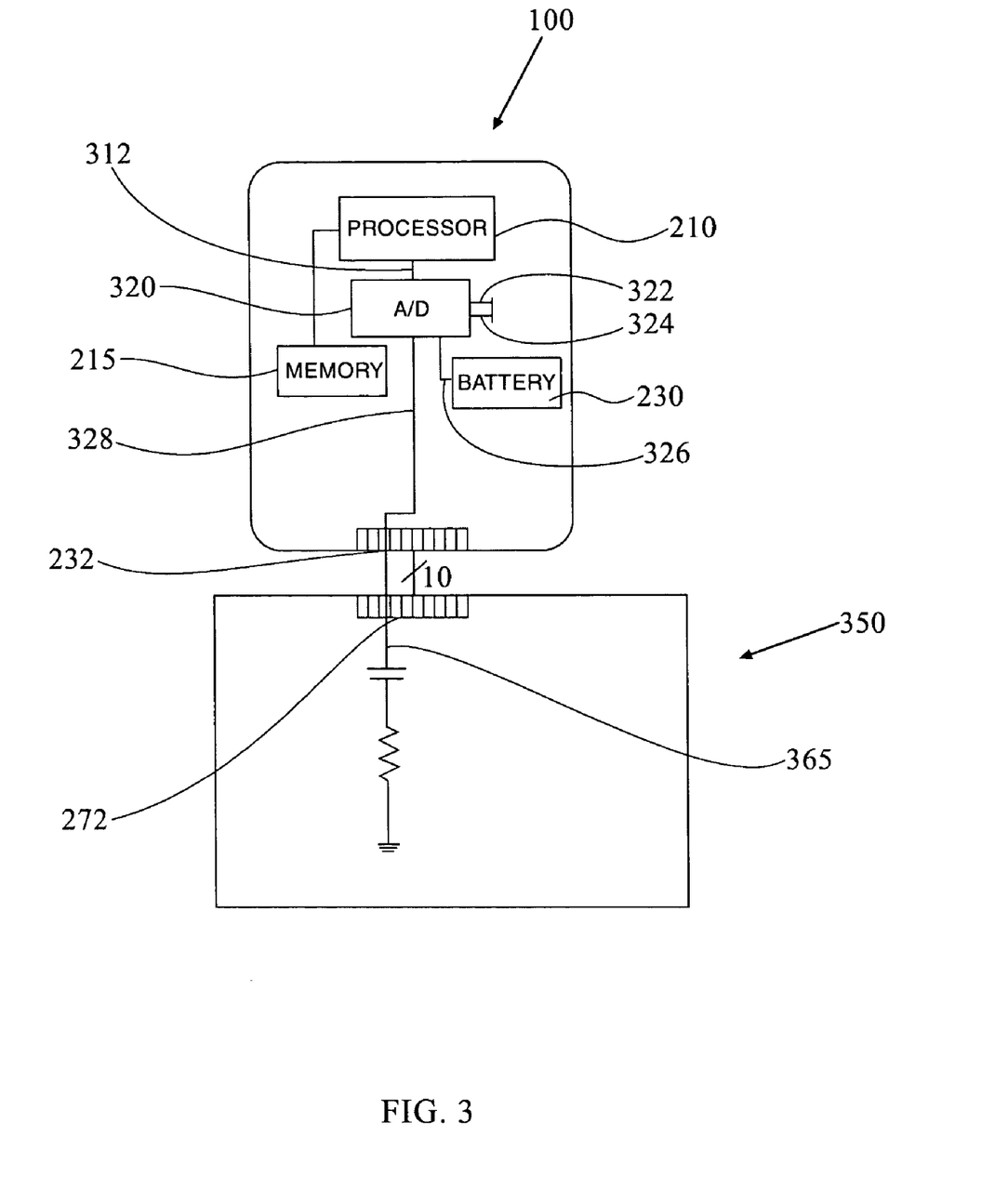
FIG. 3 is an embodiment of this invention for detecting a type of an accessory device connected to the portable computing device.
Figure 4A:
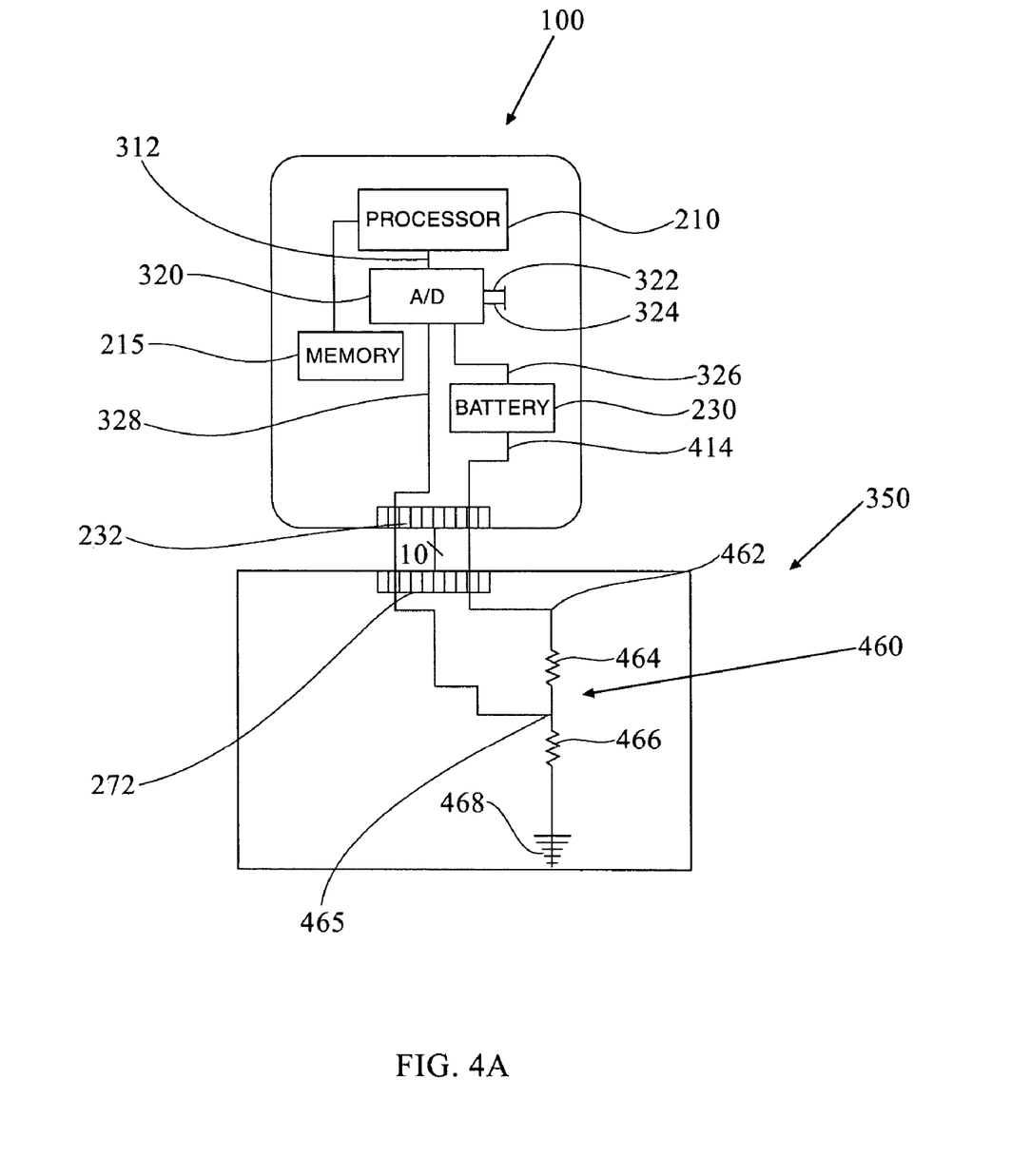
FIG. 4A is another embodiment of this invention for detecting a type of an accessory device connected to the portable computing device.
Figure 4B:
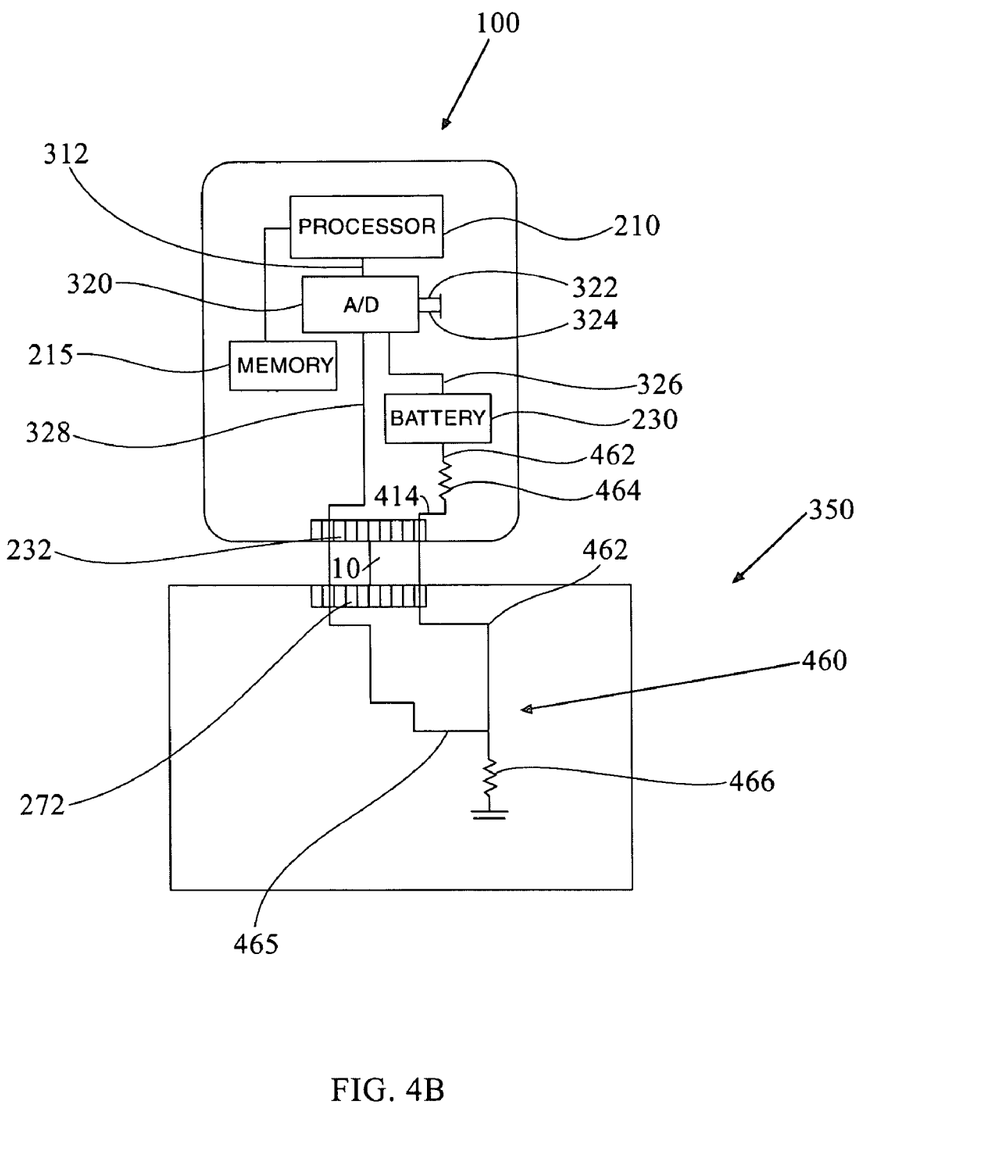
FIG. 4B is another embodiment of this invention for detecting a type of an accessory device connected to the portable computing device.
Figure 5:
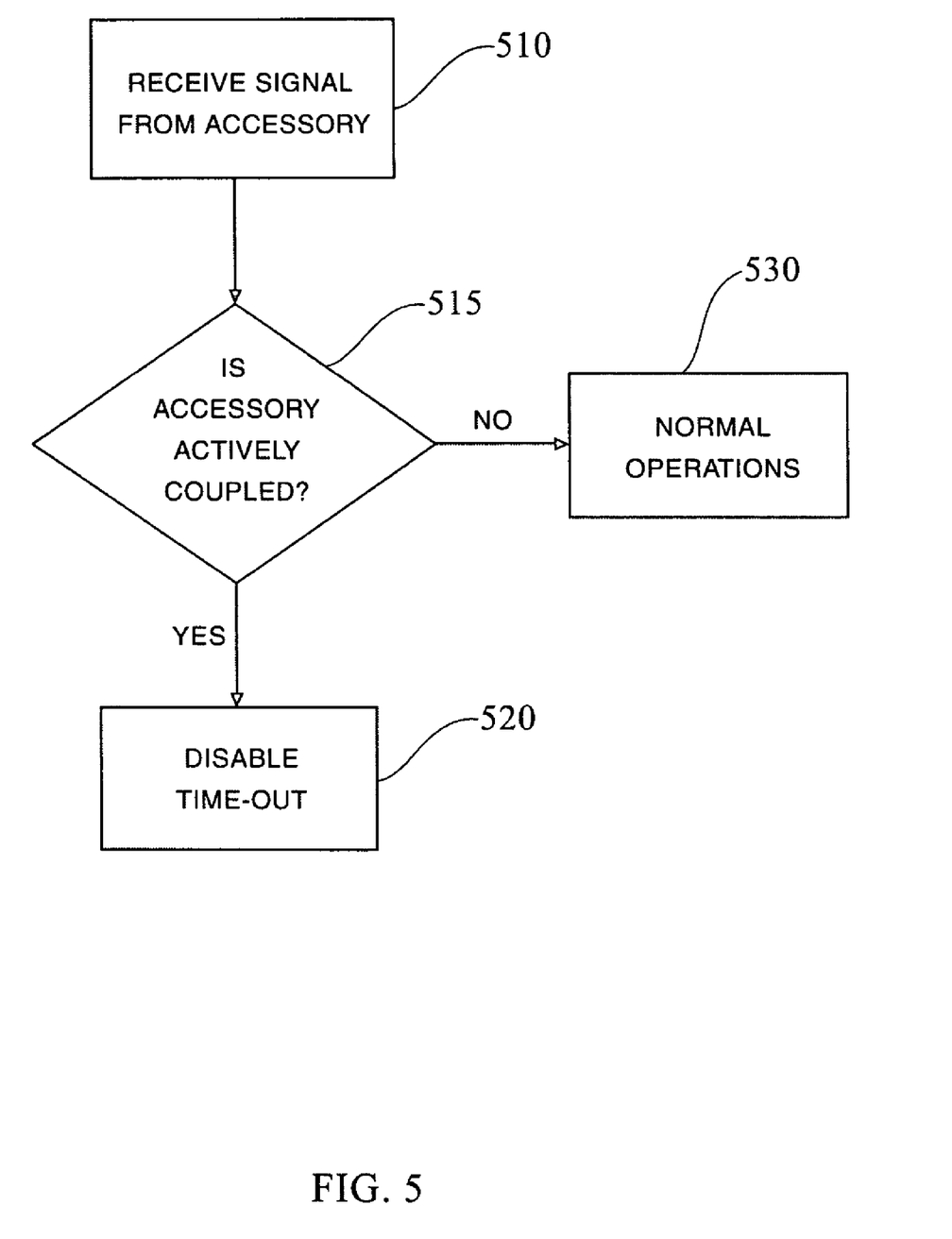
FIG. 5 is a flowchart of an algorithm for detecting a communication device actively connected to the portable computing device.
Figure 6:
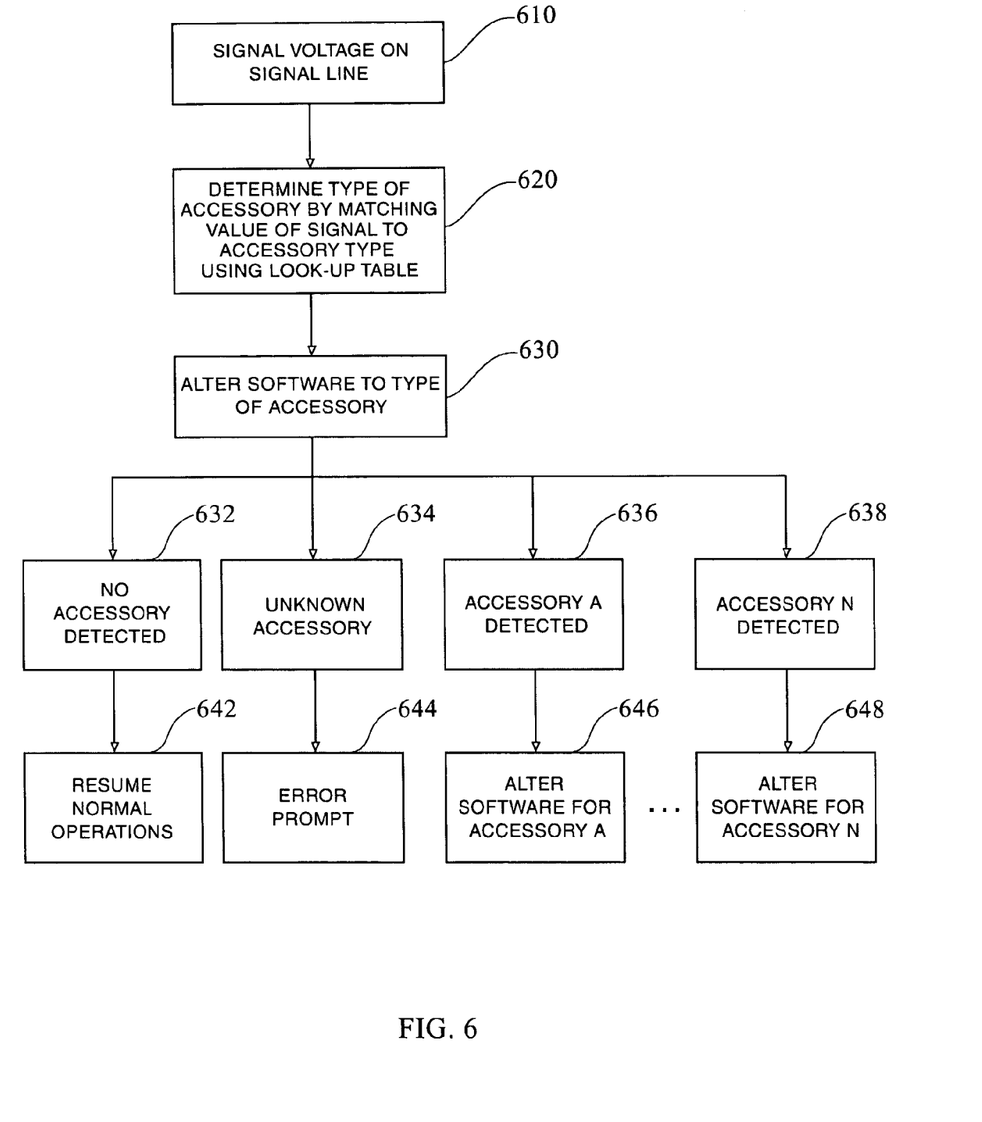
FIG. 6 is a flowchart of another algorithm for determining a type of an accessory connected to the portable computing device.

This disclosure initially describes a portable computer and accessory device for use with various embodiments of the invention, including user features of the portable computer that may be affected or altered. In FIG. 2 and accompanying text, the disclosure describes hardware for detecting whether an accessory device is connected to the portable computer. In FIGS. 3, 4A, and 4B and text accompanying these figures, the disclosure describes embodiments for detecting the type of accessory device connected to the portable computer. In FIG. 5 and accompanying text, an algorithm is presented for detecting whether the accessory device is actively connected to the portable computer. In FIG. 6 and accompanying text, an algorithm is described for detecting an accessory type connected to the portable computer.

In an embodiment of this invention, the portable computer includes three modes of operation. For purpose of this disclosure, an "on-mode" is a mode in which a processor of the portable computer is fully operational. A "doze-mode" is a mode in which a processor is operating fewer functions to conserve energy. For example, in the doze-mode, a display may be on, but a user may experience a pause between the time an input in entered and processed. In the "sleep-mode", the portable computer is in its lowest state of power consumption, where the display is off and a processor is performing minimal functions such as time-keeping.

For purposes of this description, a computer is a combination of a processor and a memory. A portable computer is a computer having a portable energy resource. Handheld computers are portable computers designed to be held with one hand.

Portable Computer and Accessory Device

Figure 1:
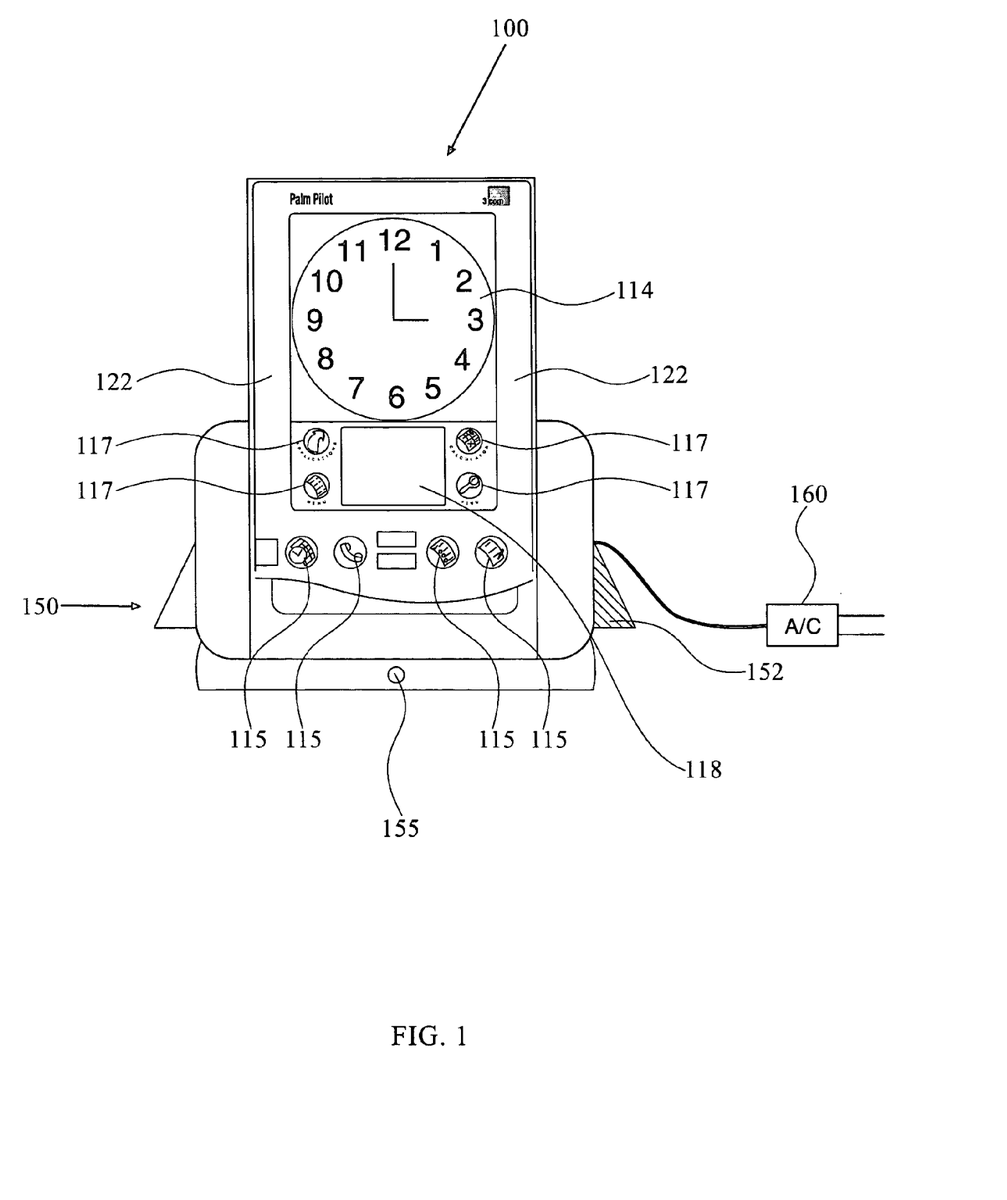
FIG. 1 illustrates a portable computing device that may incorporate an embodiment of the invention.

With reference to FIG. 1 an embodiment of this invention includes a portable computer 100 and an accessory device. Preferably, the portable computer 100 has interactive hardware and software that perform functions such as maintaining calendars and phone lists. The portable computer 100 shown in FIG. 1 includes a plurality of input functions keys 115 and a display 114 having graphic user interface features. The display 114 may be provided with an interface that allows the user to select and alter displayed content using a pointer such as a stylus. In an embodiment, the display 114 also includes a Graffiti™ writing section 118 for tracing alphanumeric characters as input. A plurality of application buttons 117 for performing automated or pre-programmed functions may be provided on a portion of the display 114. The portable computer 100 may also include an antenna for receiving wireless communications. An example of a suitable portable computer 100 for use with embodiments of this invention include handheld computers such as PalmPilot™, Palm III™, Palm IV™, Palm V™ organizers, manufactured by the 3Com Corporation. Other embodiments of the invention can include Windows CE™ portable computers, or other handheld computers and personal digital assistants.

The stylus for inputting information onto the display 114 may slideably mount to a rail (not shown) on one of the lateral sides 122 of the portable computer 100. In an embodiment, the rail may be provided with logic and electromechanical switches to perform functions based on the movement and position of the stylus. The rail may provide an "on/off" function, where removal of the stylus activates the portable computer 100 for user operation. For example, removal of the stylus may actuate a switch (not shown) implemented with the rail to activate the portable computer 100. The switch may be formed from an electromagnetic coupling between a metal stylus and a conductive element on the rail, where removal of the stylus forces a current. In another embodiment, a spring having a conductive surface may biasly obstruct the path of the stylus along the rail, so that removal of the stylus alters the length of the spring to close the switch.

As will be further described, the accessory device may include a plug-in communication cradle 150 having a parallel port for data transfer with a data network or another computer. Other embodiments may provide for another type of accessory device that equips the portable computer 100 with, for example, serial communication abilities as provided by a modem device or Universal Serial Bus (USB) cradle. The communication cradle 150 includes a stand 152, and an A/C adapter 160 that extends electricity from an external socket to power the portable computer 100. The communication cradle 150 also includes one or more ports for parallel and/or serial data transfer with other computers or data networks. The portable computer 100 may use the communication cradle 150 for the purpose of downloading and uploading software, and for synchronizing data on the portable computer 100 with a personal computer (not shown, but may be included or used with some embodiments of the invention). The communication cradle 150 couples to the portable computer 100 through a connector (see FIGS. 2-4) of the stand 152. A button 155 may effectuate an electrical connection between the communication cradle 150 and the portable computer 100 when the two are connected.

In an embodiment, the portable computer 100 includes hardware and/or software to detect whether the communication cradle 150 is actively connected to the portable computer 100. One advantage provided by this embodiment is that software on the portable computer 100 may be altered and/or reconfigured to optimize functions of the portable computer 100 according to whether the accessory device is actively connected. In this way, the portable computer 100 may launch programs that are practical only when external power is available. FIG. 1 shows that the portable computer 100 may, for example, run a program to continuously display a world-clock on the display 114 when the communication cradle 150 is detected. Importantly, in this example, the type of accessory device indicates that the power is being supplied from an external source so leaving the portable computer 100 does not drain the battery.

The portable computer 100 also accommodates alternative types of accessory devices, such as a modem port or a USB cradle. An embodiment of the portable computer 100 under this invention may include resources to detect a type of accessory, and may further alter or reconfigure software to accommodate the specific accessory type without requiring user input. This feature safeguards against the portable computer 100 being prompted to execute an application for the wrong accessory device. For some accessory devices such as USB cradles, the accessory device may be damaged if the portable computer executes an application for another type of accessory device such as a modem port. This invention provides that the portable computer 100 will run the correct application for a particular accessory type. For example, the portable computer 100 will not execute the modem application if the accessory device is a USB device or cradle. In this manner, the portable computer 100 may implement software for a particular accessory type with minimal user attention, while precluding the possibility of running a program for the wrong accessory device.

Detecting an Accessory Device

FIG. 2 is an illustrative block diagram showing additional details of an embodiment of the portable computer 100 connected to communicate with an exemplary accessory device. In the embodiment shown by FIG. 2, the accessory device is the plug-in communication cradle 150 having a parallel communication port for coupling the portable computer 100 to an external processor. The communication cradle includes an integrated A/C adapter for operating the portable computer 100 independent of an internal battery source.

With further reference to the embodiment of FIG. 2, the portable computer 100 includes a processor 210, a memory, and a battery source 230. Preferably, the processor 210 is a Motorola EZ Dragonball 328™ processor, and the memory 215 is a separate component that provides Random Access Memory (RAM). The battery source 230 internally powers the processor 210 and memory 215, as well as other electrical components within the portable computer 100. The battery source 230 may be standard disposable batteries, or rechargeable such as Lithium-ion batteries. The portable computer 100 also includes a communication port 232 having a pin connector for coupling to a mating pin connector accessible in an output port 272 of the communication cradle 150.

The processor 210 extends a signal line 205 to a pin element of the pin connector of the output port 272. The portable computer 100 and communication cradle 150 may electrically connect using only some of the pin elements of the respective pin connectors. For example, the communication port 232 may include a ten pin male connector, where nine pins are designated for functions such as parallel data transfer, parity, and "hot sync" functions for coupling the portable computer 100 with another computer. One remaining pin is available for coupling without affecting the remaining pins. The example shown in FIG. 2 couples the available pin to the signal line 205. In one configuration, the signal line 205 and the available pin are initially pulled high using a pull-up resistor. When the pin connector is mated to electrically connect with the communication cradle 150, the pin and signal line 205 are pulled low. The change in voltage on the signal line 205 signals the processor 210 that an electrical connection between the communication cradle 150 and portable computer 100 is established. The processor 210 may then execute a program based on the accessory device being actively connected to the portable computer 100.

The programs executed by the processor 210 include certain software applications that preserve battery resources. The portable computer 100 may have a time-out feature designed to significantly reduce the power consumption of the device when the portable computer is inactive or not in use. In general, the time-out feature operates by switching the portable computer 100 from a state of high power consumption to a state of low power consumption when the portable computer detects inactivity for a predetermined duration of time.

Portable computers typically use some power at all times for the purpose of maintaining a clock, memory etc. Therefore, the portable computer 100 may include multiple states of power consumption, rather than just the "on" and "off" mode. The states of the portable computer may include the "doze-mode" in which the display 114 is powered, but some resources within the portable computer 100 have stopped. The states of the portable computer 100 may also typically include a "sleep-mode", where the portable computer 100 is consuming significantly less power, but performing a few limited functions such as maintaining the clock.

The time-out feature provides that the portable computer 100 enters a state of low power consumption such as the sleep-mode if the processor 210 is substantially inactive after a predetermined time-period. For example, the known art provides that the portable computer 100 may time-out into the sleep-mode when user activity ceases for more than two minutes. In devices such as PalmPilot™ organizers, the time-out feature may be programmed by the user to vary between one and three minutes.

In an embodiment of the invention, a change in voltage on the signal line 205 may signal the processor 210 to alter a portion of a program and execute code for suspending or prolonging the occurrence of the time-out feature. In one embodiment of this invention, the portable computer 100 has a switch to alternatively allow the user to selectively override the normal behavior of the time-out function when the communication cradle 150 is active. The portable computer 100 may also detect the change in the voltage on the signal line 205 for the purpose of informing the user that the communication cradle 150 is actively connected.

One advantage of suspending the time-out feature includes allowing the user to continually access the portable computer 100 without having to switch it on.

Disabling the time-out feature, or otherwise modifying the time-out feature, also allows the portable computer 100 to be optimized for certain software applications that either require minimal user interface or require proportionately greater amounts of power. Examples of such applications include energy intensive software programs that have functions outside traditional function such as of maintaining a calendar and phone numbers. For example, the portable computer 100 may include software for displaying digital photographs. Suspending the time-out feature enables the portable computer 100 to be used as a picture frame. Other examples of software applications that may be launched when the portable computer 100 has access to plug-in power include games, a world clock display, or a computer desktop companion. Suspending the time-out feature may also be used to execute applications that continuously communicate with and/or display information from a data network. Such applications may be used to display information such as a stock market ticker.

In another embodiment of the invention, the change in voltage on the signal line 205 resulting from coupling the communication cradle 150 may signal the processor 210 to alter a portion of a program for suspending or prolonging a time-out for a backlight display. Previous portable computers provide for the software control program to turn the backlight off to conserve battery power. In this embodiment, the backlight may be continuously powered when the processor 210 detects the communication cradle 150. Alternatively, the backlight can be selectively turned on or off independent of the display screen when the processor 210 determines that the communication cradle 150 is electrically connected to the portable computer 100.

By detecting whether an accessory device is actively connected, the processor 210 may also alter or reconfigure software to provide an alternative software arrangement for routine uses of the portable computer 100. For example, the processor 210 may be programmed to interpret the presence of an actively connected communication cradle 150 as representing a "home" position. In response to detecting an actively connected communication cradle 150, the processor 210 may alter or reconfigure the software to more readily accommodate a home default position. The software may, for example, be altered to redisplay a database in a new order. Accordingly, the portable computer 100 may list personal phone numbers as a default file in a menu, and list home finances as a default in a spreadsheet application, and display only "to-do" tasks such as household chores. Then, when the portable computer 100 and the accessory device are not electrically connected the processor may run software for a professional setting, including listing professional numbers and calendar items.

Detecting a Type of an Accessory Connected to the Portable Computer

FIG. 3 is a block diagram schematic of another embodiment of this invention where a portable computer is equipped to distinguish different types of accessories. In this embodiment, the portable computer 100 includes the processor 210, analog-digital (A/D) converter 320, and the battery source 230. The portable computer 100 also includes a memory 215 connected to the processor 210. The processor 210 is preferably a Motorola EZ Dragonball 328™ that is connected to the A/D converter 320 via an 8-bit connection 312. The A/D converter 320 preferably includes four channels. A first and second channel 322 and 324 of the A/D converter 320 are dedicated for display operations. A third channel 326 couples to the battery source 230. In this embodiment, a fourth channel of the A/D converter 320 is used as a signal line 328 to extend to a communication port 232 of the portable computer 100. The A/D converter 320 couples to the battery source 230 via the third channel 326 to receive a reference voltage for a comparator (not shown) incorporated within the A/D converter 320. The communication port 232 may include a male pin connector for coupling and electrically connecting with an accessory device.

In the embodiment of FIG. 3, an accessory device 350 provides a constant voltage on an output node 365. The accessory device may be one of several devices, including the communication cradle (shown by numeral 150 in FIG. 1), modem devices and USB cradles. The output node 365 of the accessory device 350 is accessed through an output port 272 to the pin connector for the communication port 232. Previous systems provide for coupling the portable computer 100 and accessory device 350 using only some of the pin elements of the 10-pin connector. As mentioned in the embodiment of FIG. 2, the communication port 232 provides a male pin connector with nine pins designated for functions such as parallel data transfer and parity, and one pin being left available for alternative uses. Each type of accessory device may be assumed to have a unique constant voltage on a corresponding output node that is accessible by the portable computer 100 through the communication port 232. Therefore, one improvement provided by some embodiments of this invention includes coupling the available pin between the A/D converter 320 and the output node of an accessory device for the purpose of detecting and distinguishing accessory devices from each other.

In an embodiment, the A/D converter 320 receives a reference voltage from the battery source 230, and an input signal from the signal line 328 extending through the available pin of the communication port 232. The A/D converter 320 may then (1) determine whether an accessory device is actively connected to the portable computer 100 via the communication port 232, as described in FIG. 2; and/or (2) determine the type of accessory device being electrically connected to it.

The portable computer 100 and the accessory device 350 may be connected so that the signal line 328 electrically contacts a mating pin in the output port 272 of the accessory device 350. When the accessory device 350 is powered, a voltage is provided on the output node 365 and to the signal line 328. The voltage on the signal line 328 is detected by the A/D converter 320. A comparator within the A/D converter 320 compares the voltage on the signal line 328 with the reference voltage supplied from the battery source 230 via the third channel 326. The A/D converter 320 can signal the memory 215 for the purpose of matching the voltage on the signal line 328 with a type of accessory. The voltages on the output node 365 of each type of accessory device may be predetermined and stored in a look-up table of the memory 215. Therefore, the look up may list accessory types according to the voltage on a corresponding output node of each accessory type. Once the memory 215 is signaled, the processor 210 may execute software to match the voltage on the signal line 328 with a type of accessory using the look-up table. For example, a modem port may provide a voltage on an output node that is distinguishable from a voltage on an output node of a communication cradle, such as the one shown in FIG. 1. Similarly, a USB cradle or device provides an output node having a distinguishable voltage from the modem port or cradle.

Distinguishing between accessory devices in this manner enables the portable computer 100 to select or alter programming to accommodate one device over another in a quick and cost efficient manner. For example, the portable computer 100 can immediately detect the presence of the USB cradle and alter software to accommodate the USB cradle. This alteration to the software can be done when the portable computer is in a doze-mode, so that the user has quicker access to functions available from coupling the USB device. In another example, the portable computer 100 may be used to preclude inadvertent detection of a modem port, because transmitting or altering programs for a modem port that is not existent can be damaging to the system.

FIG. 4A is a block diagram schematic of another embodiment in which a portable computer 100 is equipped to determine the type of accessory actively connected to it. In this embodiment, the portable computer 100 includes a processor 210, a memory 215, an analog-digital (A/D) converter 320, and a battery source 230. As with the previous embodiment, the processor 210 is preferably a Motorola EZ Dragonball™ 328 that is connected to the A/D converter 320 using an 8-bit connection 312. The memory 215 may store a look-up table similar to the embodiment of FIG. 3. The A/D converter 320 preferably includes four channels. A first and second channel 322 and 324 of the A/D converter 320 are dedicated for display operations. A third channel 326 couples to the battery source 230. A fourth channel of the A/D converter 320 is used as a signal line 328 to extend to a communication port 232 of the portable computer 100. The A/D converter 320 couples to the battery source 230 via the third channel 326 to receive a reference voltage for a comparator (not shown) incorporated within the A/D converter 320. The communication port 232 also a male pin connector for coupling and electrically connecting with the accessory device 350.

The accessory device 350 includes a voltage divider 460, and an output port 272 for mating with the portable computer 100. As with previous embodiments, the accessory device 350 may include one of many devices, including a communication cradle 150, modem device, or USB cradle. The output port 272 includes a mating pin connector for the communication port 232. The voltage divider 460 includes an input node 462, a first resistor series 464, and a second resistor series 466. One end of the second resistor 466 series is tied to ground 468. An output node 465 is extended between the first resistor series 464 and the second resistor series 466. The output node 465 extends a voltage to a corresponding pin slot on the output port 272. In this embodiment, a voltage of the input node 462 is tied to the battery source 230 of the portable computer 100 via a line 429.

The embodiment of FIG. 4A provides that the battery source 230 to feed the reference voltage to both the A/D converter 320 and to the input of the voltage divider 460. In this way, the voltage on the output node 465 may be adjusted to account for fluctuations to the reference voltage supplied to the A/D converter 320. This enables the A/D converter 320 to more accurately detect the voltage on the output node 465. Additional precision in determining the voltage in turn allows for a larger and more accurate match between detected voltages and corresponding device types. In this manner, the embodiment of FIG. 4A may be employed to distinguish among different accessory types similar to previous embodiments, but more accurately matches the voltage on the signal line 328 with the matching accessory type. Employing an 8-bit A/D converter 320 in this manner allows for up to 256 different accessory types to be matched to a distinct voltage on the signal line 328.

FIG. 4B is an embodiment similar to FIG. 4A except that the voltage divider 460 is now distributed between the portable computer 100 and the accessory device 350. In this embodiment, the voltage of the output node 465 may be determined based on a resistor series contained within the accessory device 350 that is tied to ground. The input node 462 and the first resistor series 464 couple to the battery source 230 within the portable computer 100. A voltage line 414 passes from the first resistor series 464 through the communications port 232, the output port 272 and into the accessory device 350. The voltage line 414 couples with a second resistor series 464 connected to ground 468 that forms the voltage divider 460. The voltage line 414 may be passed through one of the pin elements of the pin connectors used to couple the portable computer 100 and accessory device 350, such as the second pin shown in FIG. 2. FIG. 4B represents an alternative configuration in which the accessory device supplies a voltage from the battery source to produce a distinguishable voltage on the output node 465. Since the input voltage provided to the accessory device 350 is the same as the reference voltage to the A/D converter 320, the A/D converter is able to better distinguish between voltages on the output node 465.

Algorithm for Detecting an Accessory Device

FIG. 5 is a flowchart showing the steps by which a portable computer device such as the one shown in FIG. 2 operates depending on whether an accessory device such as the communication cradle 150 is actively connected to it. In an embodiment of this invention, the algorithm described herein may be implemented with the portable computer 100 and the communication cradle 150 supplying the portable computer 100. The communication cradle 150 described with this embodiment is intended to only be an exemplary accessory device that provides communication abilities and external power to the portable computer 100.

In step 510, the portable computer 100 receives a signal from the communication cradle 150. This step may be accomplished by signaling to the processor 210 the voltage on the signal line 205. In step 515, the processor 210 determines whether the communication cradle 150 is actively connected to the portable computer 100. This is preferably determined by a voltage on the signal line 205 being either high or low. In a corresponding embodiment, the signal line 205 floats high and is pulled low when actively connected. Under this configuration, the processor 210 determines that the communication cradle 150 is actively connected when the voltage on the signal line 205 is low.

If an accessory is detected, the portable computer 100 in step 520 alters programming of the software to disable the time-out. To accomplish this step, the processor 210 may execute programming to suspend or delay the time-out feature from turning the portable computer to a state of reduced power consumption. If an accessory is not detected, step 530 shows that the processor 210 will resume normal operations, in which case the portable computer 100 turns off after a pre-programmed duration in which the time-out feature becomes effective.

Algorithm for Detecting a Type of an Accessory Device

FIG. 6 is a flowchart showing the steps by which a portable computer device such as the one shown in FIGS. 3-4 determines the type of accessory device that is actively connected to it. For descriptive purposes, components used to describe the flowchart may be referenced with respect to the assembly shown by FIG. 4, so that the algorithm may be implemented with the portable computer 100 and any one of the accessory devices disclosed herein, including the communication cradle 150, modem device, and USB cradle.

In step 610, the signal from the accessory device is measured. This may be accomplished using the A/D converter 320 to measure the voltage value of the signal on the signal line 328.

In step 620, the algorithm determines the type of accessory by matching the signal value to the accessory type, by for example, using a look-up table. The A/D converter 320 may determine the voltage in counts, and the processor 210 then compares the counts to values stored in the look-up table. The look-up table is preferably stored in the memory 215. In step 620, the processor 210 performs steps of a program according to the type of accessory being connected to the portable computer 100. For example, the comparator will run a modem application if a modem is detected by the signal line 328, or disable the time-out feature if the communicator cradle 150 is detected.

The portable computer 100 may detect any one of n accessory types, where n represents the number of voltage counts that the A/D converter can detect. With an 8 bit connection between the A/D converter 320 and the processor 210, the A/D converter may be used to detect up to 256 different types of accessories. Other "types" of accessories that may be recognized by the portable computer 100 include "no accessory", and an "unknown accessory". A possible step 632 shows, for example, that if the voltage count is 0, then no accessory is detected. The portable computer then resumes normal operations in step 642, which assumes battery operation with no accessory device.

The processor 210 may alternatively execute step 634, which shows an "unknown" type of accessory for when the voltage determined by the A/D does not match to a corresponding type of accessory in the look-up table. Subsequently, step 644 shows that an error message is then displayed to notify the user that the accessory device does not match the portable computer 100.

The processor may determine, in step 636, that a first type of accessory device is actively connected to the portable computer 100. As shown by step 646, the processor 210 in step 646 alters the software by performing steps that accommodate the particular type of accessory. In possible steps 638 and 648, the processor 210 detects from one of other types of accessories, and program the portable computer to accommodate the particular accessory.

This invention is intended to encompass an embodiment combining the steps shown in FIGS. 5 and 6. Therefore, under an embodiment of this invention, a portable computer may determine first whether an accessory device is connected to it, and next determine the type of accessory device that is connected.

ALTERNATIVE EMBODIMENTS

Several variations and additional features may be incorporated in embodiments of this invention.

For setting software depending on whether an accessory device such as a communication cradle is actively connected to the portable computer, a switch may be provided that switches the voltage on the signal line from high to low or vice versa. The switch may be used to set a software arrangement for routine uses of the portable computer. In an embodiment, the switch may be used to distinguish between identical communication cradles, where one of the communication cradles is used for a first operational environment, and another of the communication cradles is used for another operational environment. Therefore, a user may assign one of the communication cradles to represent the "home" position, where data is arranged to prioritize personal information over professional information. Similarly, the switch may distinguish the other communication cradle to represent a "work" position, where the data arrangement prioritizes professional information.

In an embodiment of the invention, software on the portable computer 100 may be configured or set to accommodate a particular type of accessory device connected to the portable computer 100 even when the portable computer is a sleep-mode. For example, a modem device may be connected to the portable computer 100 in a sleep-mode. The portable computer 100 detects the voltage on the signal line and sets a data value based on the modem device. When the portable computer 100 is subsequently switched to an "on" or "doze" mode, the portable computer immediately makes the modem device available. Minimizing access time in this manner may provide significant advantages to portable computer s incorporating this embodiment of the invention, in that use of the portable computer is often intermittent and for relatively short durations.

CONCLUSION

The foregoing description of various embodiments of the invention have been presented for purposes of illustration and description. It is not intended to limit the invention to the precise forms disclosed. Many modifications and equivalent arrangements will be apparent.

What is claimed is:

1. A method for operating a portable computing device, the method comprising:
   detecting that an external computing device is actively connected to communicate and provide power to the portable computing device; and
   responsive to detecting the external computing device, suspending execution of at least a portion of a program that would otherwise reduce a power consumption of the portable computing device after a given duration of inactivity;
   wherein suspending execution of at least a portion of a program includes suspending occurrence of a timeout feature; and wherein the method further comprises launching a program that is transferred to the portable computing device through the external computing device once the occurrence of the time-out feature is suspended.

2. The method of claim 1, wherein launching a program includes providing a display content selected from a group of display contents consisting of a world clock, a digital image stored from a digital camera device, and a display of real-time information provided by a data network.

3. The method of claim 1, further comprising transmitting one or more communications from the portable computing device using the external computing device when the external computing device is actively connected to the portable computing device.

4. The method of claim 1, wherein detecting that an external computing device is actively connected to communicate and providing power includes measuring a voltage level of a signal provided from the external computing device.

5. The method of claim 1, wherein suspending execution of at least a portion of a program includes operating software to continuously illuminate a display of the portable computing device.

6. The method of claim 1, wherein suspending execution of at least a portion of a program includes operating software to continuously display a digital image on the display of the portable computing device.

7. A method for operating a portable computing device, the method comprising:
   detecting that an accessory device is connected to communicate and provide power to the portable computing device; and
   responsive to detecting the accessory device, suspending execution of at least a portion of a program that would otherwise reduce a power consumption of the portable computing device after a given duration of inactivity;
   wherein detecting that an accessory device is connected and providing power to the portable computing device includes coupling one or more signal lines accessible through an outlet of the portable computing device to the accessory device; and
   wherein the method further comprises determining a type of the accessory device from a signal on the one or more signal lines.

8. The method of claim 7, further comprising configuring execution of software on the portable computing device based on the type of the accessory device that is determined from the signal on the one or more signal lines.

9. The method of claim 7, wherein determining a type of the accessory device includes determining whether the accessory device is a device that extends power from an external power supply or an external computing device.

10. A method for operating a portable computing device, comprising:
   responsive to a connector of the portable computing device being connected to a connector of an accessory device, receiving on one or more signal lines, one or more signals from the accessory device, the one or more signals including a power signal;
   automatically determining a type of accessory device coupled to the portable computing device using one or more signals on the one or more signal lines; and
   responsive to receiving the power signal from the accessory device, suspending a feature for reducing power consumption of the portable computing device after a given duration of inactivity; and
   responsive to receiving one or more signals from the accessory device, executing at least one program based on the type of accessory device.

11. The method of claim 10, wherein suspending a feature for reducing power consumption of the portable computing device includes suspending the feature for reducing an intensity of light in a display of the portable computer device.

12. The method of claim 10, wherein automatically determining a type of accessory device coupled to the portable computing device includes determining a level of power that is supplied by the accessory device to the portable computing device.

13. A method for operating a portable computing device, the method comprising:
   detecting whether an external power is being provided to the portable computing device from a computing device external to the portable computing device;
   if the external power is not being provided, executing at least a portion of a program to cause the portable computing device to reduce operations and power consumption after a given duration of inactivity; else
   if the external power is being provided, suspending execution of at least the portion of the program and maintaining a display of the portable computing device at a high setting of brightness unless an input is provided from a user to reduce or turn-off the display; and
   causing the external computing device and the portable computing device to communicate with one another in response to a user-interaction with an interface of the external computing device.

14. The method of claim 13, wherein while the external power is being provided, suspending execution of at least the portion of the program includes maintaining a content appearing on a display of the portable computing device.

15. The method of claim 14, wherein the content corresponds to a digital image.

16. The method of claim 13, wherein suspending execution of at least the portion of the program includes maintaining a backlight of a display, after the backlight is turned on, while the external power is being provided.

17. The method of claim 14, wherein
   if the external power is not being provided, executing at least a portion of a program to cause the portable computing device to reduce operations and power consumption includes switching a backlight off a first given duration after the backlight is turned on;
   if the external power is being provided, suspending execution of at least the portion of the program includes maintaining the backlight on for at least a duration that is longer than the first given duration.

18. The method of claim 13, wherein
   if the external power is not being provided, executing at least a portion of a program to cause the portable computing device to reduce operations and power consumption includes switching a backlight off a first given duration of inactivity after the backlight is turned on;
   if the external power is being provided, suspending execution of at least the portion of the program includes maintaining the backlight on for at least a duration of inactivity that is longer than the first given duration of inactivity.

19. A method for operating a portable computing device, the method comprising:
   operating the portable computing device in a first mode of high power consumption;
   detecting inactivity of user-interaction with the portable computing device for a first duration of time when the portable computing device is in the first mode of high power consumption;
   responsive to detecting inactivity for the first duration of time, executing a first programmed event to switch operation of the portable computing device from the first mode into a second mode of intermediate power consumption, in which a display of the portable computing device is at least partially powered;
   detecting whether an accessory device is connected to provide power to the portable computing device;
   while the portable computing device is in the second mode, detecting inactivity of user-interaction with the portable computing device for a second duration of time,
   responsive to detecting inactivity for the second duration of time and if the accessory device is not detected as being connected, executing a second programmed event to switch operation of the portable computing device from the second mode into a third mode of lower power consumption in which the display is not powered; else
   responsive to detecting inactivity for the second duration of time and if the accessory device is detected as being connected, suspending execution of the second programmed event that would otherwise reduce a power consumption of the portable computing device after the second duration of inactivity, wherein suspending execution of the second programmed event includes performing at least one of (i) maintaining operation of the portable computing device in the second mode, or (ii) executing a third programmed event to switch operation of the portable computing device from the second mode to the first mode.

20. The method of claim 19, wherein the accessory device corresponds to a device that extends power from an external power supply.

21. The method of claim 19, wherein the accessory device is a communication device.

22. A method for operating a portable computing device, the method comprising:
   enabling execution of at least a portion of a program to selectively power on and power off a backlight of a display screen for the portable computing device in response to one or more events, wherein selectively powering on and powering off the backlight is independent of the display screen;

detecting a period of inactivity in a user-interaction with the portable computing device;

responsive to detecting the period of inactivity, suspending a feature for reducing power consumption of the portable computing device, including executing at least the portion of the program to power off the backlight independent of the display screen being powered on; and displaying a digital image while the display screen is powered on.

23. The method of claim 22, further comprising detecting whether an accessory device is providing power to the portable computing device, and responsive to determining that the accessory device is providing power, recharging a battery of the portable computing device.

24. The method of claim 23, wherein the method further comprises:

responsive to not detecting the accessory device providing power, powering off the display screen after an other period of inactivity.

25. The method of claim 22, wherein suspending a feature for reducing power consumption includes delaying execution of the feature.

26. A portable computing device comprising:

a connector comprising a plurality of signal lines;

a processor programmed to:

detect an accessory device that is connected to the connector;

automatically determine information indicating whether the accessory device is of a particular type, and responsive to determining that the accessory device is of the particular type, execute a program for the type of accessory device; and automatically detect whether the accessory device supplies power across the connector, and responsive to detecting power, suspend execution of at least a portion of a program that would otherwise reduce a power level of the portable computing device after a given duration of inactivity.

27. The portable computing device of claim 26, further comprising a rechargeable battery, and wherein the portable computing device is configured to recharge the battery when power is supplied from the accessory device.

28. The portable computing device of claim 27, further comprising:

an antenna for receiving wireless communications; and a display.

29. The portable computing device of claim 28, wherein after the processor suspends execution of at least the portion of the program, the processor is configured to continuously display data from a data network on the display for at least a duration in which the accessory device supplies power.

30. The portable computing device of claim 26, further comprising:

a display; and a backlight for the display; and wherein the processor is configured to suspend execution of at least the portion of the program by powering off the backlight independent of the display.

* * * * *